United States Patent
Lu

(10) Patent No.: US 7,236,379 B2
(45) Date of Patent: Jun. 26, 2007

(54) PASSIVE POWER FILTER CIRCUIT

(75) Inventor: Wen-Ching Lu, Yilan County (TW)

(73) Assignee: Sun Trans Electronics Co., Ltd., Taipei County (TW)

(*) Notice: Subject to any disclaimer, the term of this patent is extended or adjusted under 35 U.S.C. 154(b) by 14 days.

(21) Appl. No.: 11/297,352

(22) Filed: Dec. 9, 2005

(65) Prior Publication Data
US 2006/0202560 A1 Sep. 14, 2006

(30) Foreign Application Priority Data
Mar. 11, 2005 (TW) .............................. 94107423 A

(51) Int. Cl.
*H02M 1/12* (2006.01)
*H02M 1/14* (2006.01)
*H02M 3/335* (2006.01)

(52) U.S. Cl. .................... 363/40; 363/21.08; 363/97

(58) Field of Classification Search ................ 363/40, 363/21.08, 97
See application file for complete search history.

(56) References Cited

U.S. PATENT DOCUMENTS

| | | | | |
|---|---|---|---|---|
| 5,517,399 | A | * 5/1996 | Yamauchi et al. | 363/89 |
| 5,777,866 | A | * 7/1998 | Jacobs et al. | 363/126 |
| 6,115,268 | A | * 9/2000 | Chang et al. | 363/34 |
| 7,026,590 | B2 | * 4/2006 | Lee et al. | 219/715 |

* cited by examiner

*Primary Examiner*—Bao Q. Vu
(74) *Attorney, Agent, or Firm*—Birch, Stewart, Kolasch & Birch, LLP

(57) ABSTRACT

The present invention discloses an improved passive power filter circuit, wherein a rated compensating voltage is provided for the power factor compensating circuit in order to solve the problem of instable power output resulting from that the rated voltage is obtained via bypassing the standby power supply circuit in the conventional technology. Further, in the present invention, a circuit is used to pre-charge two filter capacitors, which are coupled to the DC output terminals of a rectifier, in order to offset the current phase advance or the current phase lag, which the conventional passive power filter circuit cannot solve, and thereby, the power factor is improved.

8 Claims, 5 Drawing Sheets

PASSIVE POWER FILTER CIRCUIT

FIELD OF THE INVENTION

The present invention relates to an improved passive power filter circuit, particularly to a power supply circuit, which can provide a rated voltage for the compensating circuit according to its requirement.

BACKGROUND OF THE INVENTION

With the advance of science and technology, people rely on electrical energy more and more, and electrical power has been a dispensable resource for modern life. Before, people were to be contented as long as there was no scarcity of electrical power. However, owing to the uprise of the living standard and the upgrade of the scientific-technological industry, high-quality power supply has been the common target of all countries. In many countries, the traditional industry has been evolved into the high-technology and high-added-value industry, and it means that various precision equipments have been extensively used; therefore, the requirement of electrical power has also changed, and in addition to purchasing the uprise of power supply quantity, users also pay much attention to the quality of power supply. For power supply quantity, building a multitude of power plants is not the only way to solve the power problem; promoting the power factor or the power efficiency of various electrical products is also an effective method. At present, most electrical equipments utilize direct current directly or indirectly; however, owing to generator systems and the need of power transmission, power plants provide alternating current. Therefore, users have to transform alternating current into direct current with AD/DC converter. Owing to low cost and simple structure, the common AD/DC converter is the diode bridge rectifier, which needs only four diodes. Refer to FIG. 2 for the voltage/current waveforms of the diode bridge rectifier. This kinds of circuit has the disadvantages of the great harmonic component of the input current, which causes the serious distortion of the input current waveform, and the phase difference between input voltage and input current, which causes the reduction of power factor, and those disadvantages will further causes power system instability or even power supply interruption. Owing to the characteristics of the internal impedance, the power factors of many current electrical devices are pretty low; however, users demands power supply quality more and more strictly now; therefore, the improvement of the power factor of power supplies become an important subject, and the technology thereof focuses on the power filter circuits of power supplies.

The main function of a power filter circuit is to make voltage and current in-phase and make a load perform like a resistor in order to reduce the harmonic component of input current, and the abovementioned function can be implemented with various circuit designs, which can be divided into passive power filter circuits and active power filter circuits. The industries usually adopt the passive power filter circuit because of its simple circuit and low cost. The passive power filter circuit is primarily composed of passive elements, such as capacitors and inductors, which are used to offset the advance or the lag of the current phase and to reduce the harmonic component of current. When the requirement of power factor is not so strict, the inductor formed of a plurality of gap-spaced silicon steel sheets is coupled to the input terminal in series, or an inductor cooperates with a capacitor to form an LC-type or π-type low pass filter. However, the lower the frequency used, the greater the inductance needed; for example, if the ATX power supply of a personal computer is a passive filter circuit, it is often big and heavy, and the best power factor thereof is only as high as 70%. Thus, for a strict power factor demand, the passive power filter is not suitable.

In order to improve the inferior power factor of the passive power filter circuit, the conventional technologies adopt a compensating circuit, installed to the original passive power filter circuit. Referring to FIG. 1, the conventional passive power filter circuit comprises: an overload protection circuit 11, a surge current-limiting circuit 12, a first filter circuit 13, a power factor regulating circuit 14, a rectifier 15, a power factor compensating circuit 16, a second filter circuit 17, a power source push circuit 18, a main voltage transformer 19, an output rectifier 20, a power source feedback circuit 21, a standby power supply circuit 22, and output filter circuits 23, 24, 25. The power factor compensating circuit 16 is composed of two diodes D4, D5 connected in series and a capacitor C8. The power factor compensating circuit 16 needs a voltage supply to provide a rated voltage for the capacitor C8 in order to pre-charge filter capacitors C5, C6 and obtain a compensating effect; therefore, in addition to being a standby power source and providing power for a control IC 211, the standby power supply circuit 22 bypasses a loop from the cathode of the diode D6 thereof to provide power for the power factor compensating circuit 16 so that the power factor compensating circuit 16 can charge the capacitor C8, and thereby, the objective of compensating power factor is achieved, and the output power factor is improved. However, the power factor compensating circuit 16 can only obtain an unchangeable rated voltage via the supply voltage bypassed from the standby power supply circuit 22 to the power factor compensating circuit 16; further, the control IC 211 of the power source feedback circuit 21, which usually needs a specified power that cannot be altered arbitrarily, will be interfered owing to the bypass of the standby power supply circuit 22; thus, the power source feedback circuit 21 may malfunction, and the power supply output may become instable.

In conclusion, the passive power filter circuit has the disadvantages of noise, working frequency vibration, and low power conversion efficiency, and the passive power filter circuit installed with the conventional compensating circuit still has the problem of instable power output. Therefore, there is still room to improve the passive power filter circuit in spite of its extensive application.

SUMMARY OF THE INVENTION

The primary objective of the present invention is to provide an improved passive power filter circuit, wherein the power factor compensating circuit will not obtain voltage supply via bypassing the standby power supply circuit, but a voltage supply circuit is designed to provide voltage for the power factor compensating circuit according to the voltage requirement of the power factor compensating circuit in order to solve the problem of instable power output resulting from obtaining the rated voltage via bypassing the standby power supply circuit.

Another objective of the present invention is to provide a multi-stage power factor compensating circuit, which cooperates with the voltage supply circuit mentioned in the primary objective to improve the power factor of a power supply in order to meet the electrical standard and save fabrication cost.

To achieve the abovementioned objectives, the present invention installs a coil winding N2, which cooperates with a diode D3 and capacitor C7 to form a power factor-compensating voltage supply circuit 27, as shown in FIG. 3. The power factor-compensating voltage supply circuit 27 can provide a rated compensating voltage for the power factor compensating circuit 16 according to the type of compensating circuit in order to solve the problem of instable power output resulting from obtaining the rated voltage via bypassing the standby power supply circuit 22. Further, the power factor-compensating voltage supply circuit 27 cooperates with a multi-stage power factor compensating circuit 26 to enable the passive power filter circuit to pre-charge the filter capacitors C5, C6 at different stages so that the current phase advance or the current phase lag, which the conventional passive power filter circuit cannot solve, can be offset.

DETAILED DESCRIPTION OF THE PREFERRED EMBODIMENTS

Figure 1:
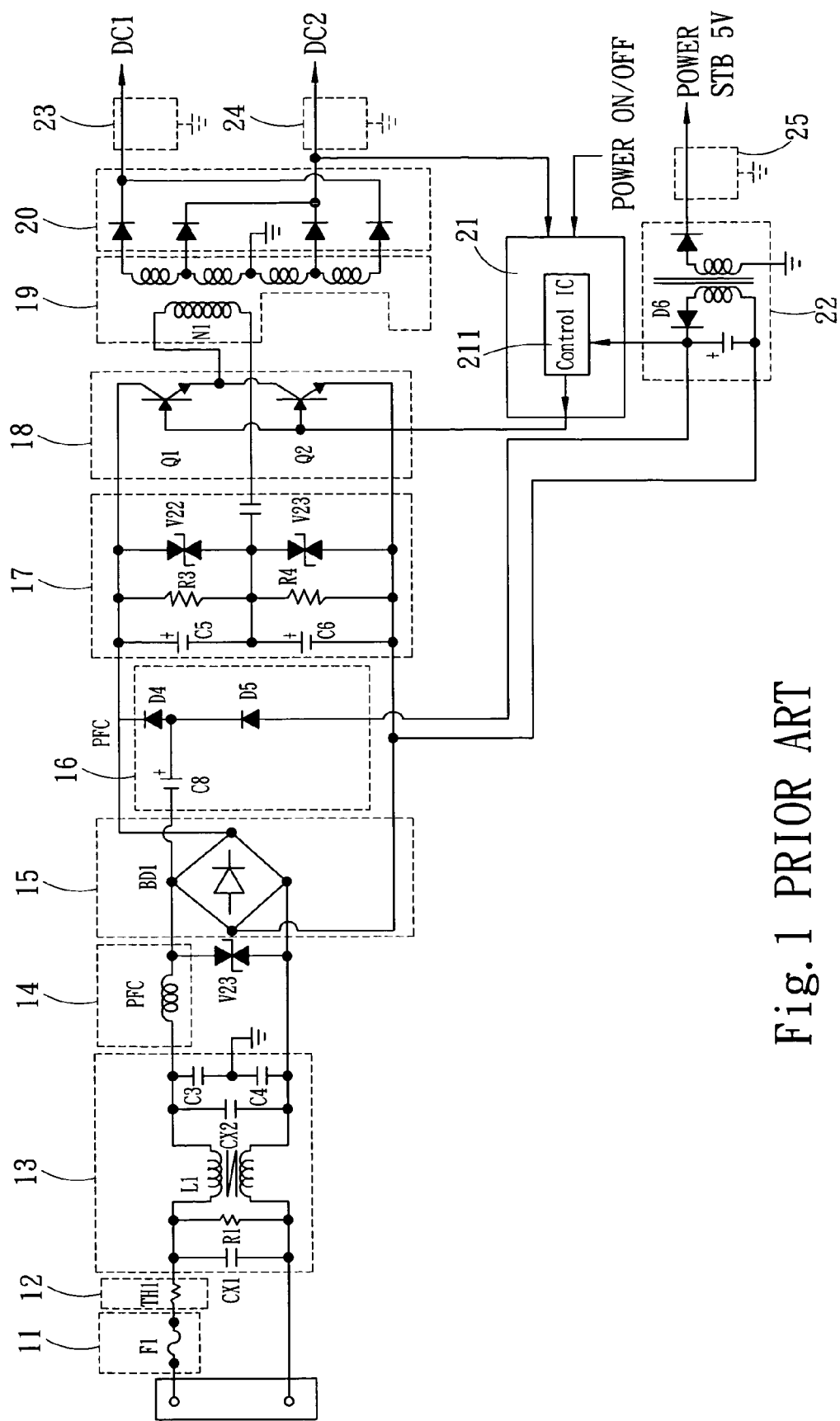
FIG. 1 is a diagram schematically showing the structure of a conventional power factor compensating circuit.
Figure 2:
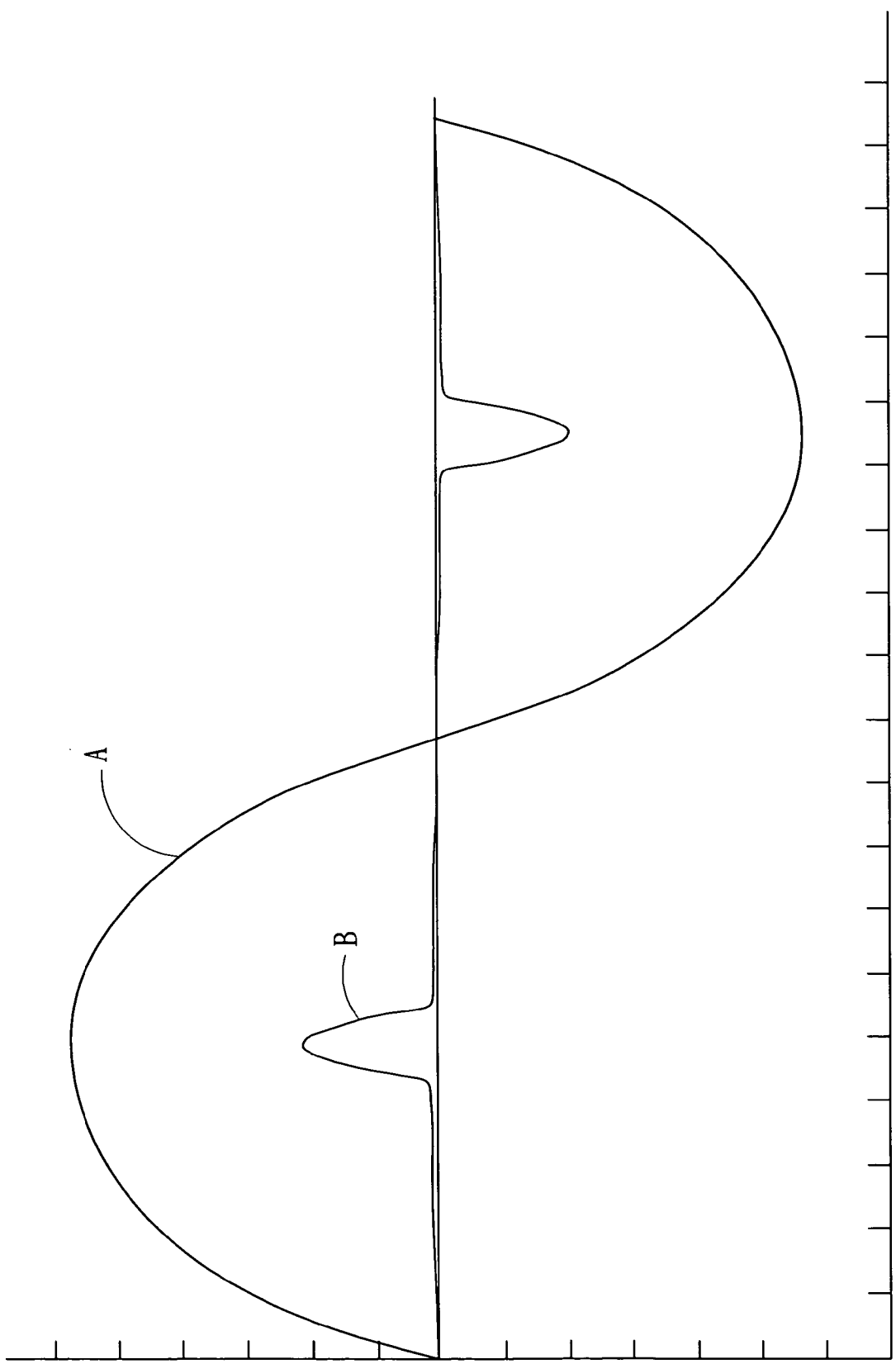
FIG. 2 is a diagram showing the voltage/current waveforms of a conventional passive power filter circuit.
Figure 3:
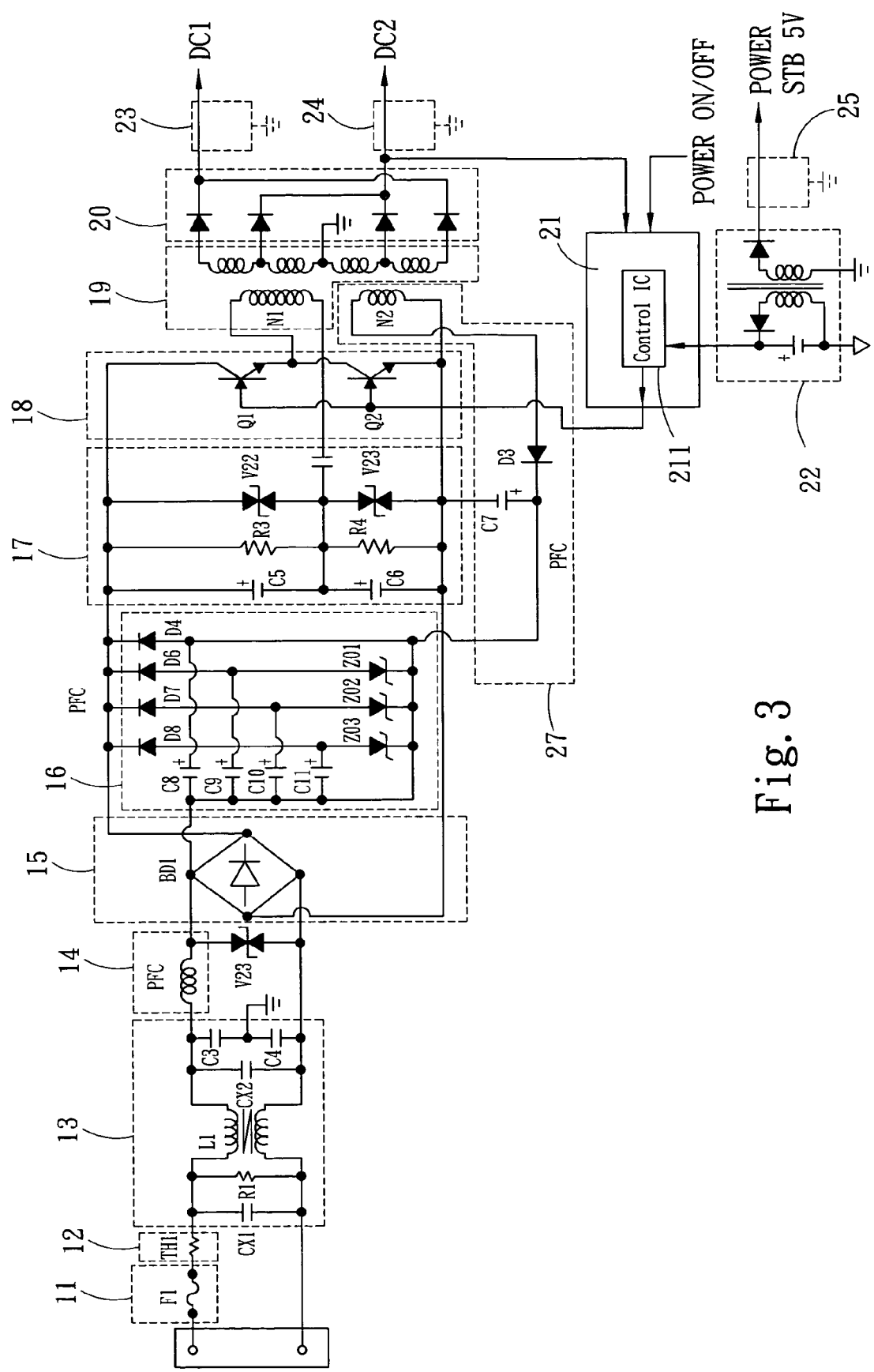
FIG. 3 is a diagram schematically showing the structure of a first embodiment of the present invention.

Refer to FIG. 3 for the structure of a first embodiment of the present invention. The improved passive power filter circuit according to the first embodiment of the present invention primarily comprises: the overload protection circuit 1, the surge current-limiting circuit 12, the first filter circuit 13, the power factor regulating circuit 14, the rectifier 15, the power factor compensating circuit 16, the second filter circuit 17, the power source push circuit 18, the main voltage transformer 19, the output rectifier 20, the power source feedback circuit 21, the standby power supply circuit 22, the output filter circuits 23, 24, 25, and a power factor-compensating voltage supply circuit 27. The power factor regulating circuit 14 is a coil winding and responsible for providing a harmonic oscillation effect for two filter capacitors C5, C6 of the second filter circuit 17 in order to advance the current phase. The power factor-compensating voltage supply circuit 27 is composed of a coil winding N2, which is electrically coupled to the primary side of the main voltage transformer 19, two diodes D3, D5 and a capacitor C7, which are electrically coupled to the coil winding N2. The power factor-compensating voltage supply circuit 27 provides a rated voltage for the power factor compensating circuit 16, and the turn number of the coil winding N2 can be adjusted according to the rated voltage required by the power factor compensating circuit 16 so that the voltage output by the power factor-compensating voltage supply circuit 27 can meet the requirement of the power factor compensating circuit 16. Meanwhile, the power factor-compensating voltage supply circuit 27 is not bypassed from the standby power supply circuit 22 but an independent loop; therefore, neither the malfunction of the power source feedback circuit 21, which results from bypassing the standby power supply circuit 22 and the interference on the control IC 211, nor the instable power output will occur.

Figure 4:
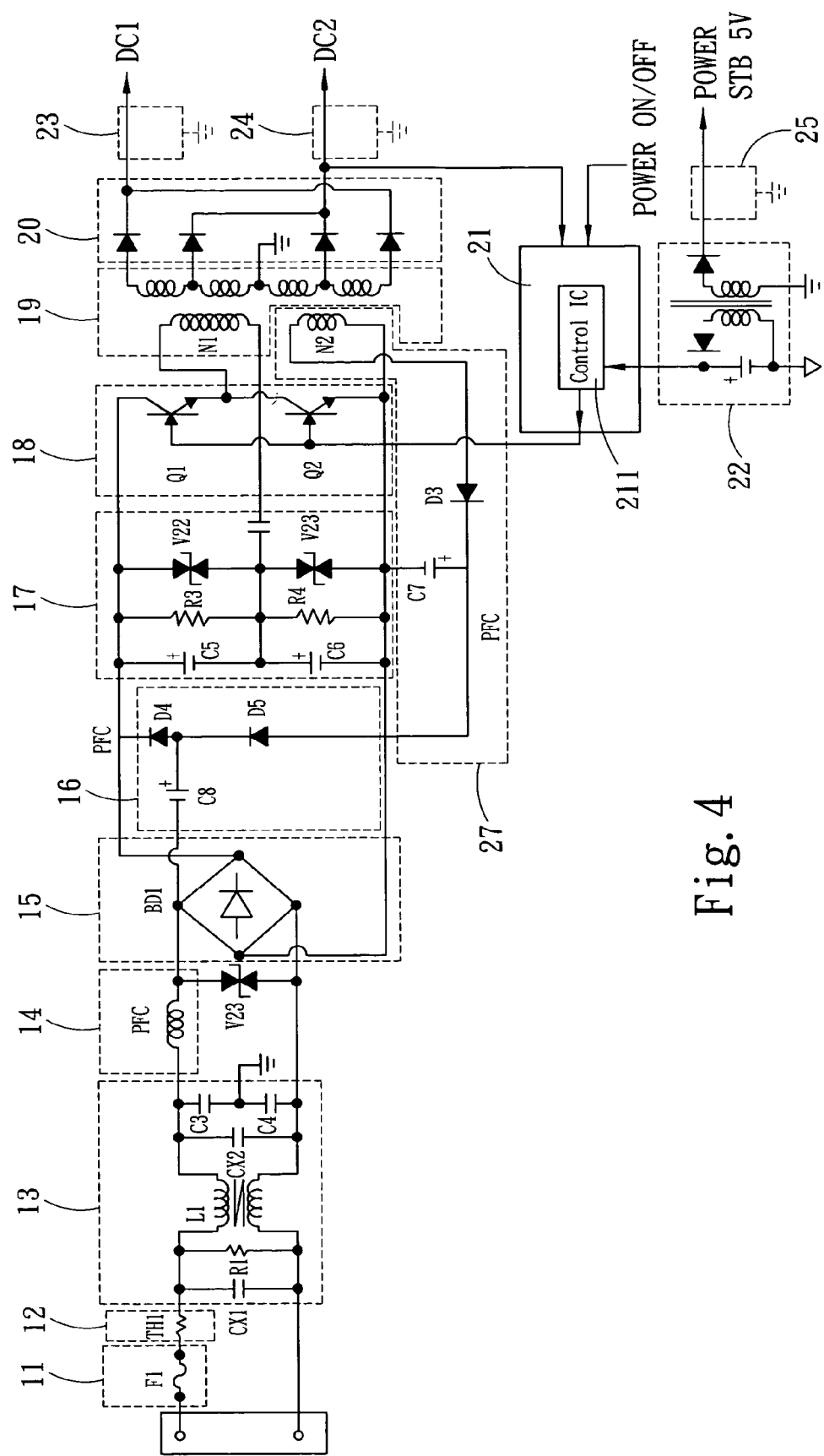
FIG. 4 is a diagram schematically showing the structure of a second embodiment of the present invention.

Refer to FIG. 4 for the structure of a second embodiment of the present invention. The improved passive power filter circuit according to the second embodiment of the present invention primarily comprises: the overload protection circuit 11, the surge current-limiting circuit 12, the first filter circuit 13, the power factor regulating circuit 14, the rectifier 15, a multi-stage power factor compensating circuit 26, the second filter circuit 17, the power source push circuit 18, the main voltage transformer 19, the output rectifier 20, the power source feedback circuit 21, the standby power supply circuit 22, the output filter circuits 23, 24, 25, and the power factor-compensating voltage supply circuit 27. The power factor-compensating voltage supply circuit 27 provides a rated compensating voltage for the multi-stage power factor compensating circuit 26. The multi-stage power factor compensating circuit 26 is electrically coupled to the rectifier 15, which has AC input terminals and DC output terminals, and pre-charges the filter capacitors C5, C6 at different stages. The multi-stage power factor compensating circuit 26 comprises multiple sub-compensating-loops paralleled to each other, and the sub-compensating-loops are composed of a diode D4, D5, D6, D7, a capacitor C8, C9, C10, C11 and a Zener diode Z01, Z02, Z03.

Figure 5:
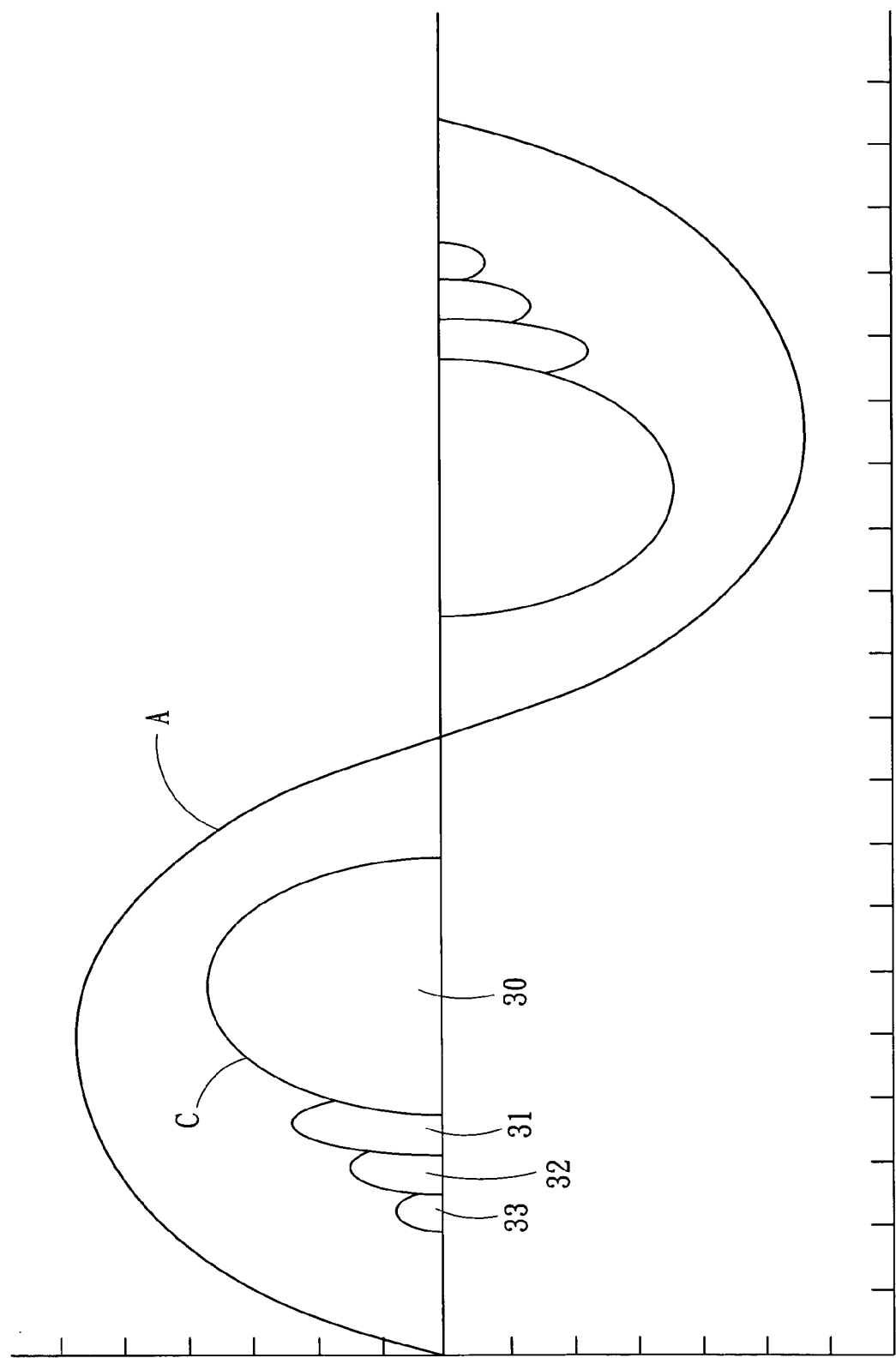
FIG. 5 is a diagram showing the voltage/current waveforms of the present invention after power-factor regulation.

Refer to FIG. 4. The power factor-compensating voltage supply circuit 27 provides a voltage supply VCC to sequentially charge the capacitors C8, C9, C10, C11 via the diode D5 at the upper half-wave; the capacitor C8 is charged to the full VCC; the capacitor C9 connected to the Zener diode Z01 is charged to ¾ VCC; the capacitor C10 connected to the Zener diode Z02 is charged to ²⁄₄ VCC; the capacitor C11 connected to the Zener diode Z03 is charged to ¼ VCC, wherein the power factor-compensating voltage supply circuit 27, the capacitors C8, C9, C10, C11 and the Zener diodes Z01, Z02, Z03 may be adjusted according to the values of the compensating voltages. Refer to FIG. 5. When the voltage waveform A plus the voltage of the pre-charged capacitor C8 is greater than the voltage of the filter capacitors C5, C6, the capacitor C8 pre-charges the filter capacitors C5, C6 via the diode D4, as shown in the current waveform 33 of the prolonged switch-on period. (As the capacitor C8 is charged to the full VCC, it is initiated firstly.) Then, when the voltage waveform A rises again by ¾ VCC the voltage of the pre-charged capacitor C9 and is greater than the voltage of the filter capacitors C5, C6, the capacitor C9 pre-charges the filter capacitors C5, C6 via the diode D6, as shown in the current waveform 32 of the advanced switch-on period. Then, when the voltage waveform A further rises again, the capacitor C10 pre-charges the filter capacitors C5, C6, as shown in the current waveform 31 of the prolonged switch-on period, and if necessary, the number of the stages can be increased further. When the voltage waveform A itself finally reaches the terminal voltage of the filter capacitors C5, C6, a main-loop current 30 appears and begins to charge the filter capacitors C5, C6 via the power factor regulating circuit 14 and the rectifier 15. Therefore, the passive power filter circuit can be sequentially compensated according to the technology disclosed in the present invention, and thus, the objectives of meeting the electrical standard and reducing fabrication cost are achieved.

The present invention has been clarified above with those embodiments. However, it is not intended to limit the scope of the present invention, any modification and variation according to the spirit of the present invention is included within the scope of the present invention defined by the claims stated below.

What is claimed is:

1. An improved passive power filter circuit, used to improve the input power factor of a power supply device, reduce the harmonic component of the electrical power supply and promote the efficiency of the electrical power system, and comprising:
   a rectifier;
   two filter capacitors, electrically connected to direct-current output terminals of said rectifier in series;
   a power factor compensating circuit, electrically connected to between said direct-current output terminals of said rectifier and said two filter capacitors, and advancing the switch-on time that the current from said direct-current output terminals of said rectifier charges said two filter capacitors; and
   a power factor-compensating voltage supply circuit, having an independent coil winding electrically coupled to a main voltage transformer of said power supply device, and providing a rated compensating voltage for said power factor compensating circuit.

2. The improved passive power filter circuit according to claim 1, wherein said coil winding is electrically coupled to the primary side of said main voltage transformer.

3. The improved passive power filter circuit according to claim 1, wherein said power factor-compensating voltage supply circuit is composed of said coil winding, diodes, and a capacitor.

4. The improved passive power filter circuit according to claim 1, wherein said power factor compensating circuit is a multi-stage power factor compensating circuit.

5. The improved passive power filter circuit according to claim 4, wherein said multi-stage power factor compensating circuit is installed to between said direct-current output terminals of said rectifier and said two filter capacitors, and obtains said rated compensating voltage needed by said multi-stage power factor compensating circuit from said power factor-compensating voltage supply circuit, and multi-stage advances the switch-on time that the current from said direct-current output terminals charges said two filter capacitors.

6. The improved passive power filter circuit according to claim 4, wherein said multi-stage power factor compensating circuit further comprises at least one sub-compensating-loop.

7. The improved passive power filter circuit according to claim 6, wherein said sub-compensating-loop is composed of a diode, a capacitor, and a Zener diode.

8. The improved passive power filter circuit according to claim 1, wherein via the reverse switch-on of said diode, the current output by said rectifier charges said capacitor according to the rated voltage of said Zener diode and a rated compensating voltage; when the voltage of said capacitor reaches a second rated voltage, the current of said switch-on time occurring in the process that said capacitor charges said two filter capacitors via said diode and said Zener diode.

* * * * *